US006570864B1

(12) United States Patent
Kim et al.

(10) Patent No.: US 6,570,864 B1
(45) Date of Patent: May 27, 2003

(54) INTEGRATED RECEIVING APPARATUS OF SUBTRACTIVE INTERFERENCE CANCELLATION RECEIVER AND ADAPTIVE MMSE RECEIVER

(75) Inventors: Seong-Rag Kim, Taejon (KR); Young-Gyun Jeong, Taejon (KR); Nam-Jin Park, Taejon (KR); In-Kyeong Choi, Taejon (KR)

(73) Assignee: Electronics and Telecommunications Research Institute (KR)

( * ) Notice: Subject to any disclaimer, the term of this patent is extended or adjusted under 35 U.S.C. 154(b) by 0 days.

(21) Appl. No.: 09/441,611

(22) Filed: Nov. 16, 1999

(30) Foreign Application Priority Data

Nov. 16, 1998 (KR) .......................... 1998-49110

(51) Int. Cl.[7] .............................. H04Q 7/20; H04Q 7/32
(52) U.S. Cl. ...................... 370/342; 370/343; 370/441; 370/479; 455/67.3; 455/63; 375/148
(58) Field of Search ................................ 370/342, 343, 370/441, 479; 455/283, 284, 295, 296, 67.3, 67.1, 63, 65, 303, 226.3, 550, 403, 422; 375/148, 144

(56) References Cited

U.S. PATENT DOCUMENTS

| 5,343,496 A | 8/1994 | Honig et al. ................... 375/1 |
| 5,425,059 A | 6/1995 | Tsujimoto ................... 375/347 |
| 5,644,592 A | 7/1997 | Divsalar et al. ............. 375/206 |
| 6,002,727 A | * 12/1999 | Uesugi ....................... 370/342 |
| 6,172,969 B1 | * 1/2001 | Kawakami et al. ......... 370/342 |
| 6,259,688 B1 | * 7/2001 | Schilling et al. ............ 370/342 |

OTHER PUBLICATIONS

IEEE, Modified Adaptive LMMSE Receiver for DS–CDMA Systems in Fading Channels, 1997, pp. 554–558.
IEEE, A Modified MMSE Receiver for Detection of DS–CDMA Signals in Fading Channels, 1996, pp. 898–902.
IEEE, Improved Parallel Interference Cancellation for CDMA, 1998, pp. 258–268.

* cited by examiner

Primary Examiner—William Trost
Assistant Examiner—Keith Ferguson
(74) Attorney, Agent, or Firm—Blakely Sokoloff Taylor & Zafman (57) ABSTRACT

A method for canceling an interference signal by using a parallel multi-stage structure in a code division multiple access (CDMA) system, includes the steps of: a) delaying a receiving signal; b) receiving and predicting data and channel parameter from the individual user; c) regenerating the interference signal of the individual user by using the data and the channel parameter predicted by the multiple receiving and predicting; and d) canceling all the interference signals delayed and transferred through the delaying by the interference signal regenerated through the multiple interference regeneration.

22 Claims, 5 Drawing Sheets

INTEGRATED RECEIVING APPARATUS OF SUBTRACTIVE INTERFERENCE CANCELLATION RECEIVER AND ADAPTIVE MMSE RECEIVER

FIELD OF THE INVENTION

The present invention relates to an enhanced multi-user receiving apparatus for a code division multiple access (CDMA) system; and, more particularly, to an integrated receiving apparatus of a subtractive interference cancellation receiver and an adaptive minimum mean squared error (MMSE) receiver for a CDMA system.

DESCRIPTION OF THE PRIOR ART

In general, techniques about adaptive MMSE receivers are disclosed in articles, such as S. L. Miller and A. N. Barbosa, "A Modified MMSE Receiver for Detection of DS-CDMA Signals in Fading Channels", Proc. MILCOM'96, pp. 898–902 and M. Latvaaho and M. Juntti, "Modified Adaptive LMMSE Receiver for DS-CDMA Systems in Fading Channels", Proc. PIMRC'97, pp. 554–558.

An adaptive MMSE receiver shows much better performance than a conventional CDMA receiver does in a static channel. Also, the adaptive MMSE receiver can suppress out-of-cell interference in a multi-cell channel environment. However, the radio channels are not static but time varying and fading. In fading environments, specifically under the low signal to interference plus noise ratio (SINR) during the deep fading, the performance of the adaptive MMSE receiver is severely degraded.

And, a thesis, M. K. Varanasi and B. Aazhang, "Multistage detection in asynchronous code-division multiple-access communications "IEEETr. on Commun., vol. 38, No. 4, pp. 509–519, April 1990 and another thesis S. R. Kim, J. G. Lee and H. Lee, "Interference cancellation scheme with simple structure and better performance" Electronic Letters, November 1996, vol. 32, No. 23, pp. 2115–2117 refer to an apparatus of a subtractive interference cancellation receiver.

The subtractive interference cancellation receiver has better performance in comparison with an existing conventional CDMA receiver in a general wireless channel environment. However, the subtractive interference cancellation receiver cannot suppress the interference caused by other cells in multiple cell environments.

SUMMARY OF INVENTION

It is, accordingly, an object of the present invention to provide an integrated receiving apparatus of a subtractive interference cancellation receiver and an adaptive MMSE receiver that is capable of overcoming limitations of the subtractive interference cancellation receiver and the adaptive MMSE receiver and having improved performance.

In accordance with one aspect of the present invention, there is provided an apparatus for canceling an interference signal by using a parallel multi-stage structure in a code division multiple access (CDMA) system, comprising: a delay unit for delaying the receiving signal in regular sequence; and an interference cancellation unit for canceling the interference of the signal, which is delayed and transmitted through said delay unit.

In accordance with another aspect of the present invention, there is provided a method for canceling an interference signal by using a parallel multi-stage structure in a code division multiple access (CDMA) system, comprising the steps of: a) delaying a receiving signal; b) receiving and predicting data and channel parameter from the individual user; c) regenerating the interference signal of the individual user by using the data and the channel parameter predicted by the multiple receiving and predicting; and d) canceling all the interference signals delayed and transferred through the delaying by the interference signal regenerated through the multiple interference regeneration.

BRIEF DESCRIPTION OF THE DRAWING

The objects and features of the present invention will become apparent from the following description of the preferred embodiments given in conjunction with the accompanying drawings, in which.

DETAILED DESCRIPTION OF THE PREFERRED EMBODIMENTS

Figure 1:
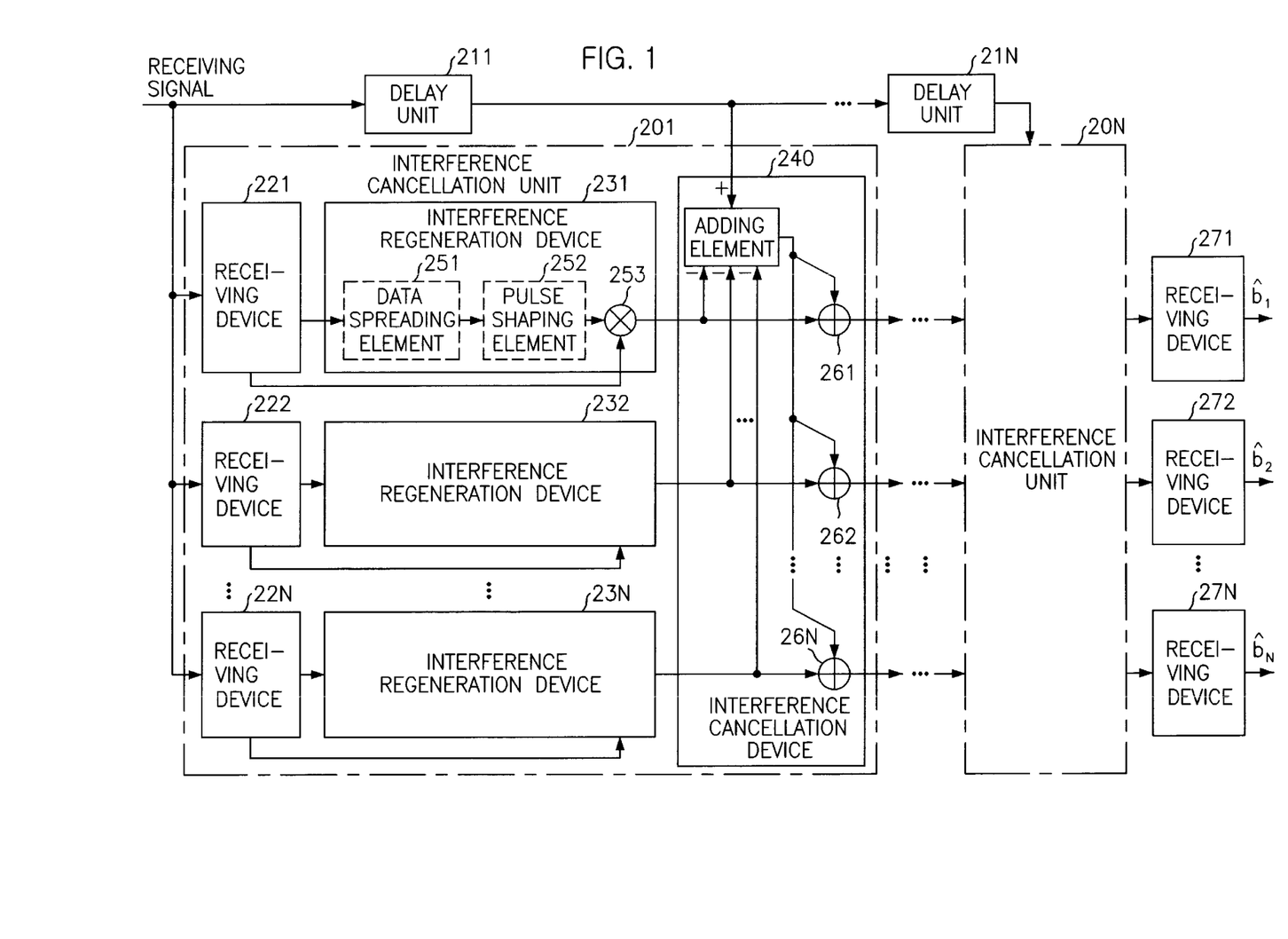
FIG. 1 is a block diagram illustrating an integrated receiver of a parallel multi-stage interference cancellation receiver and an adaptive MMSE receiver in accordance with one embodiment of the present invention.

Referring to FIG. 1, an integrated receiver of a parallel multi-stage interference cancellation receiver and an adaptive MMSE receiver includes delay units 211 to 21N and interference cancellation units 201 to 20N. The delay units 211 to 21n delay the receiving signal in regular sequence. The interference cancellation units 201 to 20N cancel interference of the receiving signal, which is delayed and transmitted through the delay units 211 to 21N.

Therefore, the interference of the receiving signal delayed by the delay unit 211 is canceled by the interference cancellation unit 201, and the interference of the receiving signal delayed by the delay unit 212 is canceled by the interference cancellation device and so on. Such an interference cancellation process is carried out until the interference of the receiving signal is canceled.

The interference cancellation unit 201 includes receiving devices 221 to 22N, interference regeneration devices 231 to 23n and an interference cancellation device 240. The receiving devices 221 to 22N receive the data and the channel parameter. The interference regeneration devices 231 to 23N regenerate the interference signal of the individual user by utilizing the data and the channel parameter predicted by the receiving devices 221 to 22N.

The interference cancellation device 240 cancels all the interference signals of the receiving signal transmitted from the individual user. Of course, the interference cancellation units 201 to 20N have the same architecture as each other.

Figure 2A:
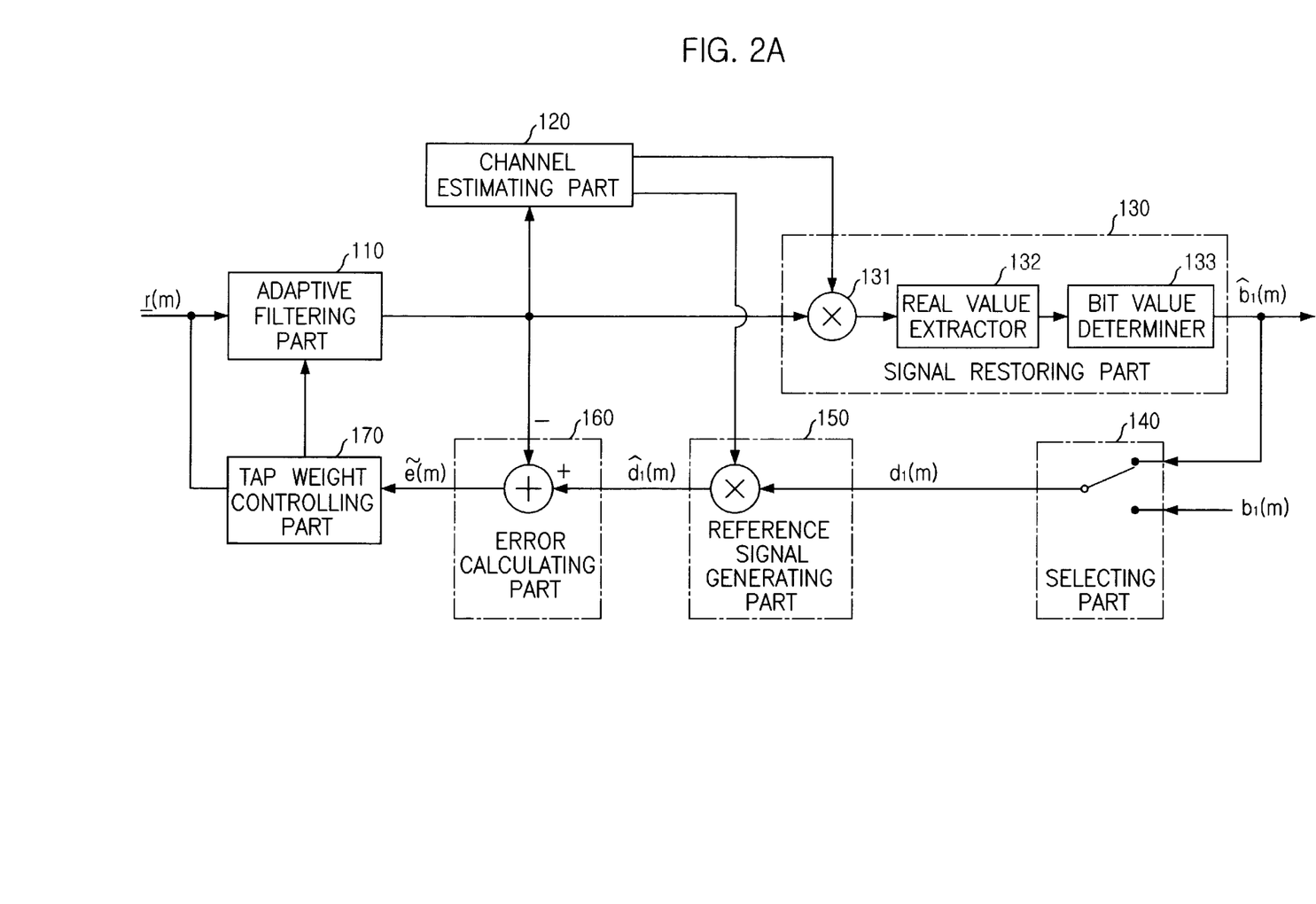
FIG. 2A is a block diagram depicting the adaptive MMSE receiver based on constrained minimum mean square error criterion shown in FIG. 1.

The receiving devices 221 to 22N are the same as the adaptive MMSE receiver shown in FIG. 2A, respectively.

The interference regeneration device 231 includes a data spreading element 251, a pulse shaping element 252 and a multiplying element 253. The data spreading element 251 spreads the data predicted by the receiving machine. The pulse shaping element 252 shapes the pulse-figured signal output from the data spreading element 251. The multiplying element 253 multiplies the output signal from the pulse shaping element 252 and the channel parameter predicted through the receiving device 221 together to output the interference signal.

Of course, the interference regeneration devices 231 to 23N have the same architectures, and this technique is well known to the public.

The interference cancellation device 240 includes an adding element 241 and adding elements 261 to 26N. The adding element 241 adds the interference signal regenerated by the interference regeneration devices 231 to 23N to the receiving signal transmitted through the delay unit 211. Adding elements 261 to 26N add the interference signal regenerated by the interference regeneration devices 231 to 23N to the added value through the adding element 241.

The operation of the integrated receiver of a parallel multi-stage interference cancellation receiver and an adaptive MMSE receiver in accordance with the present invention having the same architecture as mentioned above will be explained in detail as follows. However, thereafter the operation of the first-stage interference cancellation unit 201 will be explained for example.

The receiving devices 221 to 22N transmit the predicted data and channel parameter to the interference regeneration devices 231 to 23N, responsibly.

The interference generation devices 231 to 23N regenerate the interference signals of all the users by using the data and the channel parameter predicted through the receiving devices 221 to 22N.

The interference cancellation device 240 outputs only the signal component corresponding to the original signal by canceling all the interference components of the delayed signal through the delay unit 211 to be synchronized with the interference signal regenerated through the interference regeneration devices 231 to 23N.

In addition, the parallel multi-stage interference cancellation process is the same as the above mentioned.

FIG. 2A is a block diagram depicting an adaptive MMSE receiver for detecting a receiving signal based on constrained minimum mean square error (MMSE) criterion in accordance with the present invention.

FIG. 2A illustrates a preferable configuration of the adaptive MMSE receiver for detecting a receiving signal, when a signal is transmitted by a CDMA sending apparatus using a pilot symbol aided binary phase shift keying (BPSK) method.

In the FIG. 2A, 110 indicates an adaptive filtering part, 120 indicates a channel estimating part, 130 indicates a signal restoring part, 140 indicates a selecting part, 150 indicates a reference signal generating part, 160 indicates an error calculating part, and 170 indicates a tap weight controlling part.

As described FIG. 2A, the adaptive MMSE receiver includes an adaptive filtering part 110 whose tap weight is controlled by an output signal of a controlling part 170 as described later for filtering a receiving signal, removing an reference signal included in the receiving signal and extracting a desired signal; a channel estimating part 120 for estimating a phase component and a amplitude component of a particular user channel by using the output signal of the adaptive filtering part 110; a signal restoring part for restoring an original signal from a signal transmitted from a particular user by using the channel estimated signal from the channel estimating part 120 and the filtered signal from the adaptive filtering part 110; a selecting part 140 for selecting and transmitting either the restored signal from the signal restoring part 130 or a known training signal; a reference signal generating part 150 for generating a reference signal by using the channel estimated signal from the channel estimating part 120 and the selected signal from the selecting part 140; an error calculating part 160 for calculating an error between the filtered signal from the adaptive filtering part 110 and the reference signal from the reference signal generating part 150 by comparing the signals; and a tap weight controlling part 170 for controlling the tap weight of the adaptive filtering part 110 based on constrained minimum mean square error (MMSE) criterion.

Figure 2B:
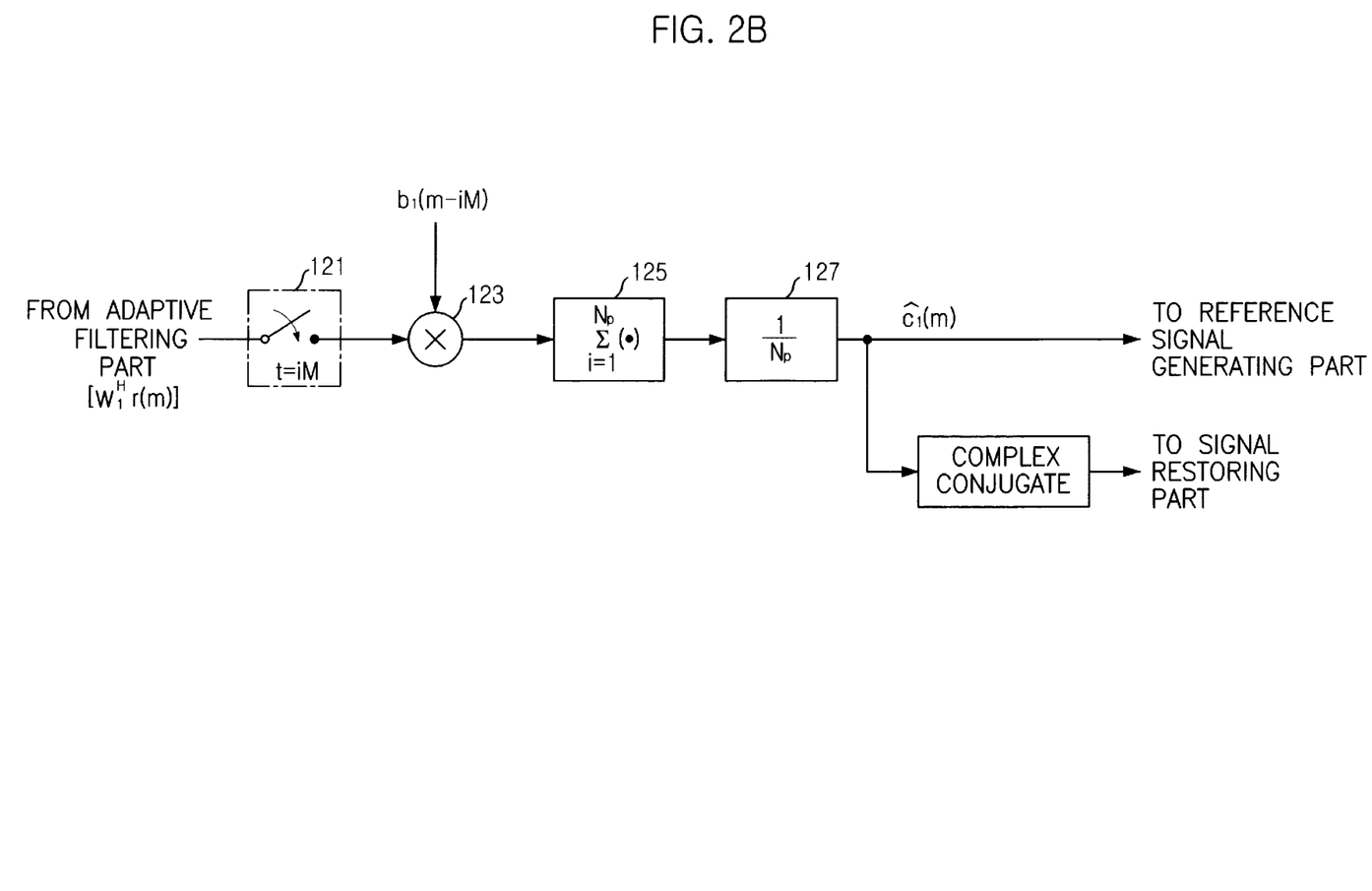
FIG. 2B is a block diagram of the channel estimating part of FIG. 2A.
Figure 2C:
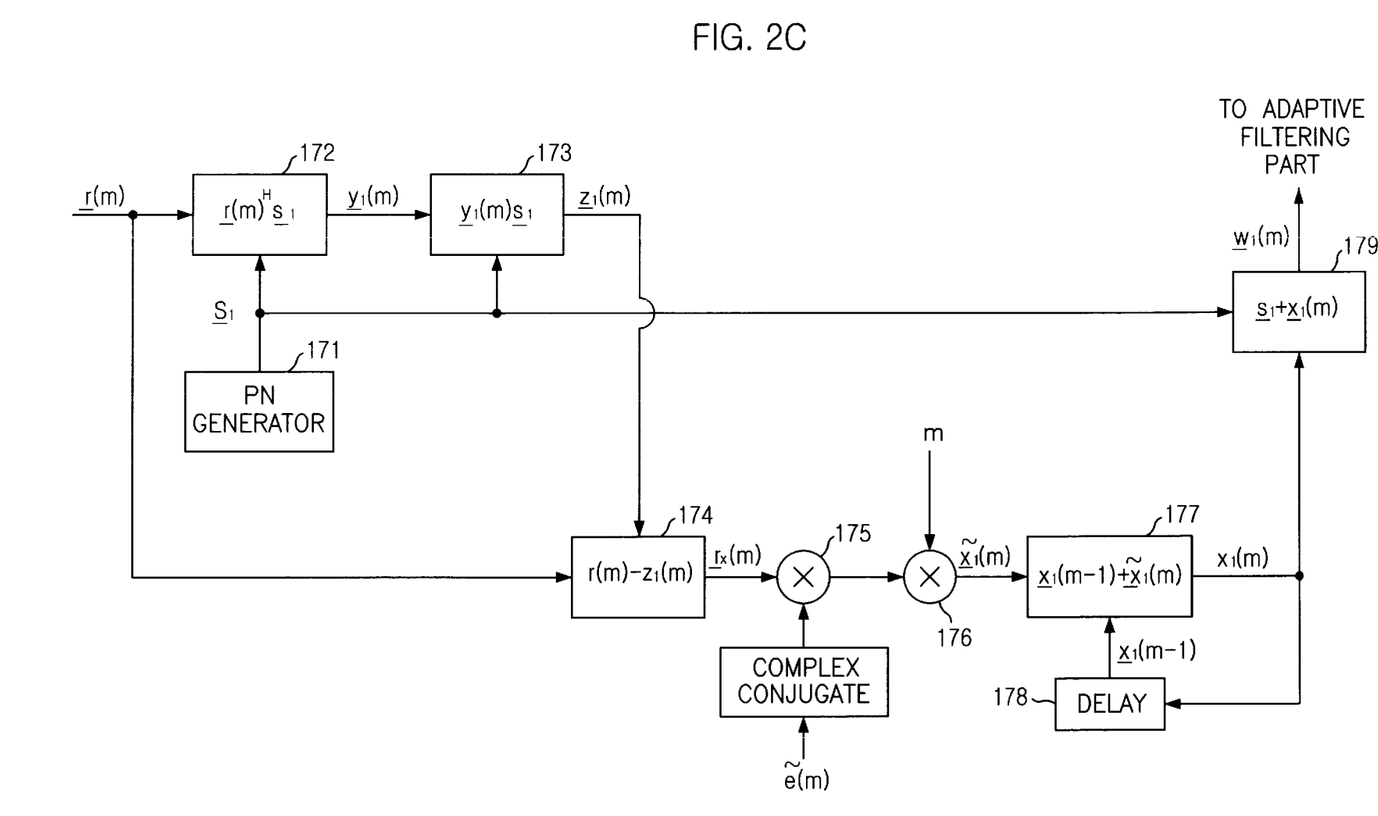
FIG. 2C is a block diagram of the tap weight controlling part of FIG. 2A.

Hereafter, with reference to FIGS. 2B and 2C, we will describe the detailed configuration of some part and operation of the adaptive MMSE receiver.

A receiving signal may include a transmitted signal from multiple users, in here, we assume that a receiving signal includes the transmitted signal from the first user of the users.

As known to FIG. 2B, a complex receiving signal $\underline{r}(m)$ is inputted to the adaptive filtering part 110 and is multiplied by a tap weight $\underline{w}(m)$. The channel estimating part 120 estimates a channel by using the output signal of the adaptive filtering part 110, then estimates a phase component $\hat{\phi}_1(m)$ and an amplitude component $\hat{\alpha}_1(m)$.

FIG. 2B is a block diagram of the channel estimating part 120 of FIG. 2A.

As described FIG. 2B, the channel estimating part 120 includes: a pilot signal extractor 121 for extracting a known pilot signal with a predetermined period included in the filtered receiving signal from the adaptive filtering part 110; an operator 123 multiplying the pilot signal by a predetermined value; an operator 125 for finding a sum of the output values from the operator 123 in a predetermined period; and an operator 127 for finding and outputting the mean by dividing the sum from the operator 123 into the number of output from the operator 121. And, the operator 127 provides the operated signal to the reference generating part 150 and provides a complex conjugate of the operated signal to the signal restoring part 130.

The signal restoring part 130 includes: an operator 131 for receiving and multiplying the complex conjugated output signal (it is reverse phase information $-\hat{\phi}_1(m)$ of the channel estimated by the channel estimating part 120) of the channel estimating part 120 by the filtered complex receiving signal of the adaptive filtering part 110; a real value extractor 132 for extracting a real component from the multiplied value from the operator 131; and a bit value determiner 133 for determining a bit value of the extracted real value from the real value extractor 132.

The reverse phase information $-\hat{\phi}_1(m)$ estimated by the channel estimating part 120 is multiplied by the output signal of the adaptive filtering part 110 via the operator 131 and is outputted in form of complex. As the result, a real component of the output is extracted by the real value extractor 132 and is applied to the bit value determiner 133.

And, the bit value determiner 133 determines the extracted real value as "1" if the value is larger than "0", otherwise, determines the extracted real value as "0", then, restores the transmitted signal from the first user.

The selecting part 140 selects a known training data and transmits it to the reference generating part 150 in a tap weight period of a predetermined range, while it selects a bit value data outputted from the bit value determiner 133 and transmits it to the reference generating part 150 in the other periods.

As described above, a training data for a tap weight is generally needed in processing a receiving signal of an adaptive apparatus. However, since the present invention uses a pilot symbol transmitted from a sending apparatus as the training data of the tap weight, it need not make and provide another training data like a conventional signal processing apparatus for adaptive receiving system.

The reference signal generating part 150 multiplies the phase component $\phi_1(m)$ and an amplitude component $\alpha_1(m)$ of the estimated channel from the channel estimating part 120 by the selected signal from the selecting part 140, outputs the result signal to the error calculating part 160 as a reference signal.

The error calculating part 160 calculates the error between the reference signal and the filtered complex receiving signal, provides the result as an error signal $\tilde{e}(m)$.

The tap weight controlling part 170 controls the tap weight to minimize the size of the error signal $\tilde{e}(m)$ detected by the error calculating part 160, provides it to the adaptive filtering part 110.

If the tap weight controlling part 170 changes the tap weight $\underline{w}(m)$ of the adaptive filtering part 110 by using a prior LMS algorithm, the change of the tap weight is expressed by an equation (1):

$$\underline{w}_1(m) = \underline{w}_1(m-1) + \mu \tilde{e}(m)^* \underline{r}(m)$$

where the $\underline{w}(m)$ indicates a tap weight vector, $\underline{r}(m)$ indicates a receiving signal vector, and $\mu$ indicates a step size determining speed for changing the tap weight of the adaptive filtering part 110, $\tilde{e}(m)$ indicates a calculated error by the error calculating part 160, and the superscript * indicates complex conjugate.

However, as described above, when a prior tap weight adaptive algorithm like the equation (1) is used to an adaptive apparatus for detecting a receiving signal, the tap weight of the adaptive filtering part 110 converges to "0".

Thus, the prior LMS algorithm cannot be used at an adaptive apparatus for detecting a receiving signal, if we intend to use the prior LMS, we must input the unfiltered input signal of the adaptive filtering part 110 instead of the filtered signal of the adaptive filtering part 110. But, such a change makes the performance of the adaptive MMSE receiver for detecting a receiving signal decreased remarkably.

Thus, the present invention employs the constrained MMSE criterion expressed by equation (2) as adaptive algorithm of the adaptive filtering part 110.

FIG. 2C is a block diagram of the tap weight controlling part 170.

As described FIG. 2C, the tap weight controlling part 170 of the present invention includes: a pseudo noise (PN) generator 171 for providing a pseudo noise (PN) signal; an operator 172 for multiplying the PN signal from the PN generator 171 by the complex receiving signal; an operator 173 for multiplying the PN signal by the output signal of the operator 172; an operator 174 for subtracting the output signal of the operator 173 from the receiving signal; an operator 175 for multiplying the complex conjugate of the error signal from the error calculating part 160 by the output signal of the operator 174; an operator 176 for multiplying the step size determining the controlling period of the tap weight by the output signal of the operator 175; an operator 177 for adding an operated output signal immediately before to the output signal of the operator 176; the operator 179 for adding the sum of the PN signals to the output signal of the operator 177, and providing the added value to the adaptive filtering unit as a new tap weight.

The constrained MMSE criterion according to the present invention is expressed by an equation (2):

$$J = E[|\hat{c}_1(m)d_1(m) - \underline{w}(m)^H \underline{r}(m)|^2] \text{ Subject to } \underline{w}(m)^H \underline{s}_1 = 1$$

wherein J indicates constrained minimum mean square error criterion, and E indicates a mean value and $\hat{c}_1(m)$ of $\hat{c}1(m) = \hat{\alpha}_1(m) \exp^{j\phi_1(m)}$ indicates the estimated channel from the channel estimating part 120, $d_1(m)$ indicates the output signal from the selecting, part 140, $\underline{w}(m)$ indicates a tap weight vector, $\underline{s}_1$ indicates a spreading code vector, and the subscript H indicates Hermitian operation.

The constrained MMSE criterion of the equation (2) may be implemented by using an orthogonal decomposition method. If the orthogonal decomposition method is used, the tap weight $\underline{w}(m)$ of the adaptive filtering part 110 is expressed by equation (3):

$$\underline{w}(m) = \underline{s}_1 + \underline{x}(m)$$

Where the $\underline{s}_1$ indicates a spreading code vector, the $\underline{x}(m)$ indicates an adaptive component of tap weight vector, and two vectors are orthogonal.

Accordingly, the multiplication of the tap weight vector by the spreading code vector $(\underline{w}(m)^H \underline{s}_1)$ is expressed by equation (4):

$$\underline{w}(m)^H \underline{s}_1 = (\underline{s}_1 + \underline{x}(m))^H \underline{s}_1 = \underline{s}_1^H \underline{s}_1 = \|\underline{s}_1\|^2$$

Where the multiplication $\|\underline{s}_1\|^2$ of the spread code vector is normalized to "1" (i.e. $\underline{w}(m)^H \underline{s}_1 = 1$). Consequently, the constrained MMSE criterion is expressed by an equation (5):

$$\underline{x}(m) = \underline{x}(m-1) + \mu \cdot \tilde{e}(m)^* \cdot \underline{r}_x(m)$$

Where $\underline{x}(m)$ indicates an adaptive component of the tap weight vector, $\mu$ indicates a step size, $\tilde{e}(m)$ indicates the calculated error from the error calculating part 160, $\underline{r}_x(m)$ indicates a receiving signal $\underline{r}(m)$ projected by the adaptive component of the tap weight, and the subscript * indicates a complex conjugate operation. On the other hand, the constrained MMSE criterion may be called as "LMS algorithm of an orthogonal decomposition method".

Figure 2D:
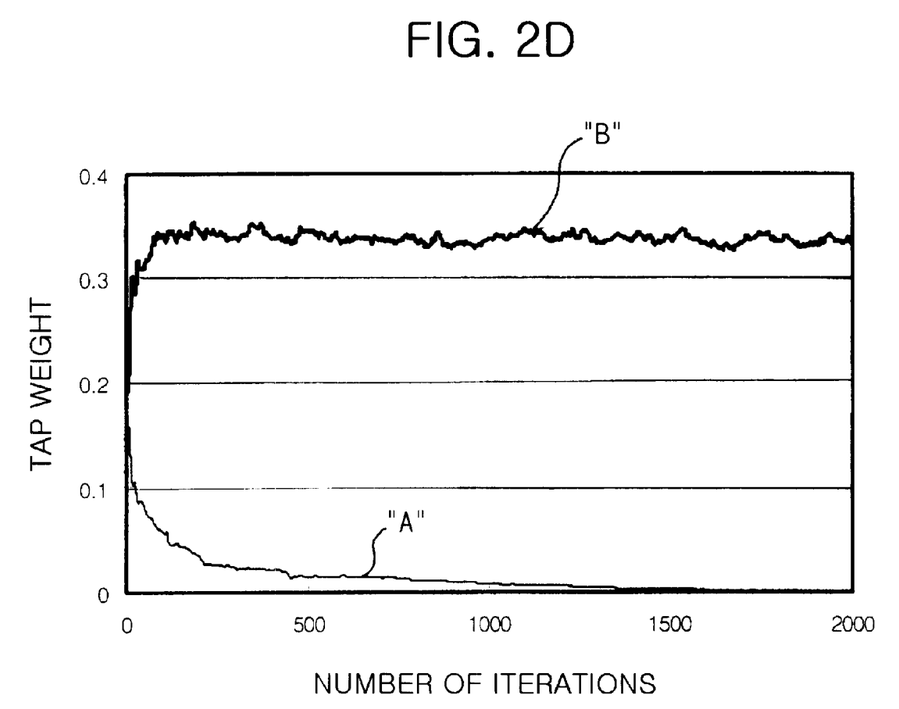
FIG. 2D is a graph showing comparison of the convergence characteristic of a tap weight of an adaptive filtering part in processing a receiving signal in accordance with the present invention with that of the adaptive filter employing a prior art.

Thus, as the apparatus processes a receiving signal successively, the adaptive filtering part 110 is normally operated like FIG. 2D (see the "B" in the FIG. 2D). The constrained MMSE criterion of the adaptive algorithm according to the present invention has the following characteristics.

The first, the algorithm differs from a prior art in that the signal with a simultaneously compensated phase and amplitude is used to a reference signal. Also, by the algorithm, the multiplication of the tap weight $\underline{w}(m)$ of the adaptive filter by the spreading code vector $\underline{s}_1$ is limited to "1" like the equation (2) so that the tap weight does not converge to "0", while a tap weight is controlled by the calculated error between the predetermined reference signal and the filtered receiving signal.

And, if the constrained MMSE criterion is implemented by using orthogonal decomposition-based LMS algorithm like the equation (5), the orthogonal decomposition-based LMS algorithm orthogonal decomposes the tap weight like the equation (3) into an adaptive component orthogonal to a spreading code vector and a spreading code vector component. Also, the algorithm uses the receiving signal projected by the adaptive component orthogonal to the spreading code vector in order to change an adaptive component orthogonal to the spreading code vector.

On the other hand, those skilled in the art could recognize that hardware may be implemented with the element functions of FIGS. 2A to 2C as well as that the most functions may be replaced by software based on the above description.

As described above, since a tap weight of an adaptive filter does not converge to "0" even if a phase and amplitude of an estimated channel are simultaneously compensated by using the output signal of an adaptive filter, the adaptive MMSE receiver for detecting a receiving signal has an improved receiving performance in a fading channel environment. Thus, the present invention can provide a high speed and quality service in radio communication. Also, since one base station can accommodate a number of subscribers, a capacity of a system is increased.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for canceling an interference signal by using a parallel multi-stage structure in a code division multiple access (CDMA) system, comprising:

a delay unit for delaying the receiving signal in regular sequence; and an interference cancellation unit for canceling the interference of the signal, which is delayed and transmitted through said delay unit, wherein said interference cancellation unit includes:

an adaptive filtering means for filtering a complex receiving signal according to a tap weight controlled by a predetermined period;

a channel estimating means for estimating a phase component and an amplitude component of a particular user channel by using the output signal of said adaptive filtering means;

a signal restoring means for restoring an original signal transmitted from the particular user by using the channel estimated signal from said channel estimating means and the filtered receiving signal from said adaptive filtering means;

a selecting means for selecting and providing either the restored signal from said signal restoring means or a known training signal;

a reference signal generating means for generating a reference signal by using the channel estimated signal from said channel estimating means and the selected signal from said selecting means;

an error calculating means for calculating an error between the filtered receiving signal from said adaptive filtering means and the reference signal from said reference signal generating means by comparing the signals;

a tap weight controlling means for controlling the tap weight of said adaptive filtering means based on constrained minimum mean square error (MMSE) criterion;

an interference regeneration device for regenerating the interference signal of the individual user by utilizing the data and the channel parameter predicted by the receiving device; and an interference cancellation device for canceling all the interference signals of the signals sent from the individual user.

2. The apparatus of claim 1, wherein the constrained MMSE criterion is, expressed by an equation (2), and the multiplication of the tap weight $\underline{w}(m)$ of said adaptive filter means by a spreading code vector $\underline{s}_1$ is practically limited to 1 to minimize the error of said error calculating means, the equation (2) is:

$$J = E[|\hat{c}_1(m)d_1(m) - \underline{w}(m)^H \underline{r}(m)|^2] \text{ subject to } \underline{w}(m)^H \underline{s}_1 = 1$$

where the J indicates constrained minimum mean square error, the E indicates a mean value, $\hat{c}_1(m)$ indicates the estimated channel, the $d_1(m)$ indicates the output signal of said selecting means, the $\underline{w}(m)$ indicates a tap weight vector, the $\underline{r}(m)$ indicates a receiving signal vector, $\underline{s}_1$ indicates the spreading code vector, and the superscript H indicates Hermitian operation.

3. The apparatus of claim 2, wherein the tap weight $\underline{w}(m)$ of adaptive filter is orthogonally decomposed to an adaptive component orthogonal to the spreading code vector and a spreading code vector component like an equation (3), and uses a receiving signal projected by the adaptive component orthogonal to the spreading code vector instead of directly using the receiving signal to change the adaptive component orthogonal to the spreading code vector, the equation (3) is:

$$\underline{w}(m) = \underline{s}_1 + \underline{x}(m)$$

where the $\underline{s}_1$ indicates the spreading code vector, $\underline{x}(m)$ indicates the adaptive component of a tap weight vector, and two vectors are orthogonal.

4. The apparatus of claim 3, wherein the constrained MMSE criterion is implemented by an orthogonal decomposition-based LMS algorithm expressed by an equation (5), the equation (5) is:

$$\underline{x}(m) = \underline{x}(m-1) + \mu \tilde{e}(m)^* \cdot \underline{r}_x(m)$$

where $\underline{x}(m)$ indicates the adaptive component of a tap weight vector, $\mu$ indicates a step size determining a speed for changing the tap weight, $\tilde{e}(m)$ indicates a calculated error, $\underline{r}_x(m)$ indicates a projected component of the receiving $\underline{r}(m)$ projected to the adaptive component of the tap weight, and the superscript * indicates complex conjugate.

5. The apparatus of claim 1, wherein said channel estimating means includes:

a pilot signal extracting means for extracting the known pilot signal with a predetermined period included in the filtered receiving signal from said adaptive filtering means;

a first operation means for multiplying the pilot signal by a predetermined value;

a second operation means for finding a sum of output values from said first operation means in a predetermined period; and a third operation means for finding and outputting the mean by dividing the sum from said second operation means into the number of output from said first operation means.

6. The apparatus of claim 5, wherein said channel estimating means provides the output signal of said third operation means to the reference signal generating means and provides a complex conjugate of output signal of said third operation means to said signal restoring means.

7. The apparatus of claim 5, wherein said signal restoring means includes:

a forth-operating means for multiplying the output of said channel estimating means by the output signal of said adaptive filtering means;

a real value extracting means for extracting a real component from the output value of said forth operation means; and a bit value determining means for determining a bit value of the extracted real value from said real value extracting means.

8. The apparatus of claim 7, wherein said reference generating means includes a fifth operation means for multiplying the channel estimated value from said channel estimating means by the selected signal from said selecting means.

9. The apparatus of claim 8, wherein said error calculating means includes a sixth operating means for adding the output signal of said adaptive filtering means to the reference signal from said reference generating means.

10. The apparatus of claim 9, wherein said tap weight controlling means includes:

a pseudo noise(PN) generating means for providing a pseudo noise(PN);

a seventh operating means for multiplying the PN signal from the PN generating noise by the receiving signal;

an eighth operating means for multiplying the PN signal by the output signal of said seventh operating means;

a ninth operating means for subtracting the output signal of said eighth operating means from the receiving signal;

a tenth operating means for multiplying the complex conjugate of the error signal from said error calculating means by the output signal of said ninth operating means;

an eleventh operating means for multiplying the step size determining the controlling period of the tap weight by the output signal of said tenth operating means;

a twelfth operating means for adding an operated output signal immediately before to the output signal of said ninth operating means; and a thirteenth operation means for adding the sum of the PN signal to the output signal of said twelfth operating means, and providing the added value to said adaptive filtering means as a new tap weight.

11. The apparatus of claim 1, wherein said interference regeneration device includes:

a data spreading element for spreading the data predicted by the receiving device;

a pulse shaping element for shaping the pulse-figured signal output from said data spreading element; and a multiplying element for multiplying the output signal from the pulse shaping element and the channel parameter predicted through the receiving device together to output the interference signal to output the interference signal.

12. The apparatus of claim 1, wherein said interference cancellation unit further includes:

first adding element for adding the interference signal regenerated through the interference regeneration device to the receiving signal transmitted through said delay unit, thereby generating a first added value; and a second adding element for adding the interference signal regenerated through the interference regeneration device to the first added value through said first adding element.

13. A method for canceling an interference signal by using a parallel multi-stage structure in a code division multiple access (CDMA) system, comprising the steps of:

a) delaying a receiving signal;

b) receiving and predicting data and channel parameter from an individual user including the steps of:

b1) removing an interference signal from a receiving signal according to a tap weight of an adaptive filter controlled by a predetermined period, b2) estimating a phase component and amplitude component of a particular user channel by using a filtered complex receiving signal, b3) restoring an original signal transmitted from the particular user from the filtered complex receiving signal by using a channel estimated value, wherein the filtered complex receiving signal is estimated as a receiving signal transmitted from the particular user, b4) selecting and providing either the restored signal from the third step b3) or a known training signal, b5) generating a reference signal by using a channel estimated signal and the selected signal, b6) calculating an error between the filtered complex receiving signal and the reference signal by comparing the signals, and b7) re-establishing the tap weight of the adaptive filter based on constrained minimum mean square error (MMSE) criterion, then repeating said steps b1) to b7), c) regenerating the interference signal of the individual user by using the data and the channel parameter predicted in the step b); and d) canceling all the interference signals delayed and transferred through the delaying by the interference signal regenerated through the step c).

14. The method of claim 13, wherein the constrained MMSE criterion is expressed by an equation (2), and multiplication of the tap weight $\underline{w}(m)$ of the adaptive filter and a spreading code vector $\underline{s}_1$ is practically limited to 1 to minimize the calculated error from the error calculating step, the equation (2) is:

$$J = E[|\hat{c}_1(m)d_1(m) - \underline{w}(m)^H \underline{r}(m)|^2] \text{ Subject to } \underline{w}(m)^H \underline{s}_1 = 1$$

where the J indicates constrained minimum mean square error criterion, the E indicates a mean value, the $\hat{c}_1(m)$ indicates the estimated channel, the $d_1(m)$ indicates the output signal of the forth step, the $\underline{w}(m)$ indicates a tap weight vector, the $\underline{r}(m)$ indicates a receiving signal vector, the $\underline{s}_1$ indicates a spreading code vector, and the superscript H indicates Hermitian operation.

15. The method of claim 14, wherein the tap weight $\underline{w}(m)$ of adaptive filter is orthogonal decomposed to an adaptive component orthogonal to the spreading code vector and a spreading code vector component like an equation (3), and uses a receiving signal projected by the adaptive component orthogonal to the spreading code vector instead of directly using the receiving signal to change the adaptive component orthogonal to the spreading code vector, the equation (3) is:

$$\underline{w}(m) = \underline{s}_1 + \underline{x}(m)$$

where the $\underline{s}_1$ indicates the spreading code vector, $\underline{x}(m)$ indicates the adaptive component of a tap weight vector, and two vectors are orthogonal.

16. The method of claim 15, wherein the constrained MMSE criterion is implemented by an orthogonal decomposition-based LMS algorithm expressed by an equation (5), the equation (5) is:

$$\underline{x}(m)=\underline{x}(m-1)+\mu\cdot\tilde{e}(m)^*\cdot\underline{r}_x(m)$$

where $\underline{x}(m)$ indicates the adaptive component of a tap weight vector, $\mu$ indicates a step size determining a speed for changing the tap weight, $\tilde{e}(m)$ indicates a calculated error, $\underline{r}_x(m)$ indicates a projected component of the receiving $\underline{r}(m)$ projected to the adaptive component of the tap weight, and the superscript* indicates complex conjugate.

17. The method of claim 13, wherein said step b2) includes the steps of:
   b2-1) extracting a known pilot signal with a predetermined period included in the filtered receiving signal from the first step;
   b2-2) multiplying the pilot signal by a predetermined value;
   b2-3) adding all the output values of said step b2-2) in a predetermined period; and
   b2-4) finding and outputting the mean by dividing the sum of said step b2-3) into the number of output values of said step b2-2).

18. The method of claim 17, wherein said step b3) includes the steps of:
   b3-1) multiplying the output signal of the second step by the output signal of said step b1);
   b3-2) extracting a real component from the output value of said step b4); and
   b3-3) determining a bit value of the extracted real value from the real value-extracting step.

19. The method of claim 18, wherein said step b7) includes the steps of:
   b7-1) providing a pseudo noise(PN);
   b7-2) multiplying the receiving signal by the PN signal;
   b7-3) multiplying the output signal of said step b7-2) by the PN signal;
   b7-4) subtracting the output signal of said step b7-3) from the receiving signal;
   b7-5) multiplying the complex conjugate of the error signal from said step b7-3) by the output signal of said step b7-4);
   b7-6) multiplying the step size determining the controlling period of the tap weight by the output signal of said step b7-5);
   b7-7) adding the operated output signal immediately before to the output signal of said step b7-6); and
   b7-8) adding the PN signal to the output signal of said step b7-7), and providing the sum to the adaptive filter as a new tap weight.

20. The method of claim 13, wherein said step c) includes the steps of:
   c1) spreading data predicted by the receiving device;
   c2) shaping a pulse-figured signal output from the step c1); and
   c3) multiplying the output signal from a pulse shaping element and the channel parameter predicted through a receiving device together to output the interference signal.

21. The method of claim 13, wherein said step d) includes the steps of:
   d1) adding the interference signal regenerated through a interference regeneration device to the receiving signal transmitted through a delay unit, thereby generating a first added value; and
   d2) adding the interference signal regenerated through an interference regeneration device to the first added value through the adding element.

22. A method for canceling an interference signal by using a parallel multi-stage structure in a code division multiple access (CDMA) system, comprising the steps of:
   a) delaying a receiving signal;
   b) receiving and predicting data and channel parameter from an individual user;
   c) regenerating the interference signal of the individual user by using the data and the channel parameter predicted in the step b); and
   d) canceling all the interference signals delayed and transferred through the delaying by the interferences signal regenerated through the step c),
   wherein said step b) includes the steps of:
      b1) removing an interference signal from a receiving signal according to a tap weight of an adaptive filter controlled by a predetermined period;
      b2) estimating a phase component and amplitude component of a particular user channel by using a filtered complex receiving signal;
      b3) restoring an original signal transmitted from the particular user from the filtered complex receiving signal by using a channel estimated value, wherein the filtered complex receiving signal is estimated as a receiving signal transmitted from the particular user;
      b4) selecting and providing either the restored signal from the third step b3) or a known training signal;
      b5) generating a reference signal by using a channel estimated signal and the selected signal;
      b6) calculating an error between the filtered complex receiving signal and the reference signal by comparing the signals; and
      b7) reestablishing the tap weight of the adaptive filter based on constrained minimum mean square error (MMSE) criterion, then repeating said steps b1) to b7).

* * * * *